United States Patent [19]

Wiedenman et al.

[11] Patent Number: 4,646,076

[45] Date of Patent: Feb. 24, 1987

[54] METHOD AND APPARATUS FOR HIGH SPEED GRAPHICS FILL

[75] Inventors: Gregory B. Wiedenman, Sandy; Kenneth S. Morley, West Valley City; Gary H. Frederickson, Salt Lake City, all of Utah; Jeffrey L. Williams, Hopkinton, Mass.

[73] Assignee: Sperry Corporation, New York, N.Y.

[21] Appl. No.: 488,935

[22] Filed: Apr. 27, 1983

[51] Int. Cl.$^4$ .............................................. G09G 1/00
[52] U.S. Cl. ................................. 340/747; 340/703; 340/728; 340/750
[58] Field of Search ............... 340/703, 747, 750, 723, 340/728, 701, 744

[56] References Cited

U.S. PATENT DOCUMENTS

| | | | |
|---|---|---|---|
| 3,821,796 | 6/1974 | Ernstoff | 340/703 |
| 4,139,838 | 2/1979 | Inose et al. | 340/703 |
| 4,155,095 | 5/1979 | Kirschner | 340/703 |
| 4,217,577 | 8/1980 | Roe et al. | 340/703 |
| 4,303,986 | 12/1981 | Lang | 340/703 |
| 4,368,461 | 1/1983 | Komatsu et al. | 340/703 |
| 4,425,559 | 1/1984 | Sherman | 340/703 |
| 4,437,092 | 3/1984 | Dean et al. | 340/703 |
| 4,492,956 | 1/1985 | Collmeyer et al. | 340/747 |
| 4,528,642 | 7/1985 | Waller | 340/747 |

Primary Examiner—Marshall M. Curtis
Attorney, Agent, or Firm—John B. Sowell; Thomas J. Scott; Lawrence J. Marhoefer

[57] ABSTRACT

A method and apparatus for performing high speed graphics fill is provided. Any closed line geometric shape or polygon that can be defined by pixel position is stored in memory. The memory pixel positions are stored in address locations corresponding to row and column positions. A first sequential examination of the data is made in reverse raster scan order to make a preliminary determination of the pixel positions inside the closed polygon. A second sequential examination of the data is made in forward or regular raster scan order and a final determination is made whether the pixel positions are inside the polygon and shall be filled. The final determination of pixel positions to be filled is stored shortly before the graphics fill operation is performed so that the fill operation is performed in raster scan time at high speed.

13 Claims, 11 Drawing Figures

METHOD AND APPARATUS FOR HIGH SPEED GRAPHICS FILL

BACKGROUND OF THE INVENTION

1. Field of the Invention

This invention relates to a method of performing graphics fill of line formed geometric shapes displayed on a screen of a video display terminal. More particularly, this invention discloses a novel method for determining graphic fill pixel positions that may be implemented in simplified high speed hardware form.

2. Description of the Prior Art

Graphics fill is a term which is employed herein to define the process of coloring or shading areas inside of a geometric shape or polygon defined by lines. The lines which define the area to be filled should be closed to form the geometric shape or polygon of any irregular shape. Since the lines which define the shape are being displayed on an electronic display panel, the lines are formed by individual dots or points herein called pixels, thus, any geometric shape straight or curved is composed of a series of dots or straight lines of the type which are displayed on a display panel. For purposes of this invention, the polygon may be defined by pixel or dot positions on the screen of a visual display panel such as a cathode ray tube (CRT) or equivalent display having a plurality of pixel or dot positions. The individual pixel graphic line positions may be stored in the memory, such as those currently employed with visual display terminals, to maintain the graphic line-defined polygon on a display screen.

It is apparent that an operator of a visual display panel could place the cursor of the display panel at a plurality of points within a line-defined polygon and manually enter fill data at each of the pixel points located by the cursor. Since a typical CRT display screen for a visual display panel employs a matrix of pixels or dots on the screen which is five hundred twelve dots wide by three hundred seventy-five dots vertically long, any such manual method of entering data requires an excessive amount of time and is not acceptable.

Commercially available video display terminals have incorporated therein software routines that permit the operator to locate a single point inside of a closed polygon. After this point is indicated to the logic hardware of the terminal, the operator may initiate a fill routine. The software of the video display terminal is then programmed to operate in several ways to complete the fill operation. The faster and more complex routines are programmed to store fill data in the original selected pixel or dot position of memory, then the software continues to store fill data in the adjacent pixel or dot positions working out from the original point until a pixel or dot position is reached where the edge of the polygon is located. Thus, the software must define a program that extends the fill data outward from the selected starting point until the graphics line or boundary is reached. One recognized method of scanning and determining fill positions within a polygon is to design a polar coordinate software program. Such complex polar coordinate software programs are operable for circles, rectangles etc. that may be defined by a single vector length on each polar degree vector employed. When the polygon has irregular shapes that would require a plurality of vector lengths on one or more polar degree vectors, the software must then be refined to permit stopping of the generation of fill data and the starting again of fill generation at a longer vector length. Alternatively, the software must provide a means of scanning in more than one direction from a different point of origin. Obviously, such software programs are not only complex, but require an inordinate amount of time to perform the fill operation even when performed using a high speed electronics computer of the type available in the better and more expensive video display terminals.

It would be desirable to provide a simplified method of determining the graphics fill points within a graphics line polygon or a plurality of line polygons on a display screen of a video display terminal. It would further be highly desirable if the method could be implemented in simplified hardware to achieve high speed graphics fill automatically.

SUMMARY OF THE INVENTION

It is a principal object of the present invention to provide a novel method of scanning all pixel or dot positions on a visual display terminal screen and to determine the positions to be filled within any closed polygon defined thereon.

It is another object of the present invention to provide a high speed method of scanning all of the pixel or dot positions on a visual display terminal screen and to determine the fill positions within a polygon defined on the screen.

It is another object of the present invention to provide a novel two step method of determining the positions to be filled within a graphics polygon defined on the screen of a visual display terminal.

It is yet another object of the present invention to provide a simplified method of scanning a visual display terminal screen and determining the pixel or dot positions within a polygon defined in memory locations of the pixel graphic memory.

It is a general object of the present invention to sequentially examine in raster scan sequence each graphic pixel data word stored in a pixel graphic memory and to determine the pixel or dot addresses in memory that are addresses to be graphically filled.

It is yet another general object of the present invention to provide a simplified gating circuit for determining graphics fill memory addresses in a graphics memory at very high speeds.

According to these and other objects of the present invention, there is provided a method which makes a sequential examination of the data describing every pixel position in a graphics memory in reverse raster scan order and makes a preliminary determination of the pixel positions which should be filled as being within a closed polygon. A second sequential examination of the data describing every pixel position in the graphics memory is then made in regular raster scan order and a final determination is made whether the pixel position shall be filled. By making the first and second logic determinations with circuit hardware, the final determination of graphics pixel fill can be made and stored in the graphics pixel memory at high speeds shortly before the data employed by the electron beam of a cathode ray tube is read out of memory for display on the cathode ray tube. This permits the graphics fill operation to be completed during the time required for the cathode ray tube to scan the display twice.

DESCRIPTION OF THE PREFERRED EMBODIMENT

Before explaining the figures in detail, it will be understood that the term pixel and dot as used herein are used synonomous. When a dot or pixel position on a television type raster scan display or monitor is being discussed or examined, the data word in memory indicative of that position or location is available to the logic circuits from the pixel or dot position in memory.

Figure 1:
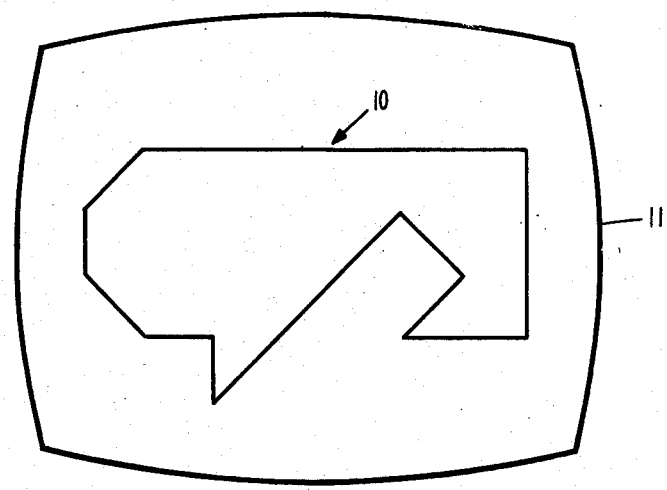
FIG. 1 is a schematic diagram of a graphics line polygon on a cathode ray tube screen of a visual display terminal.

Refer now to FIG. 1 showing an example of a single line graphics polygon 10 which is being displayed on a cathode ray tube screen of the type used in a video raster scan display terminal 11. It will be understood from examination of this polygon that there is no single point within the closed polygon that can be employed to reach all other points employing a polar coordinate system using vectors and distances. If a polar coordinate system is used to attempt to fill such a polygon, it will be lengthy and time consuming.

Figure 2:
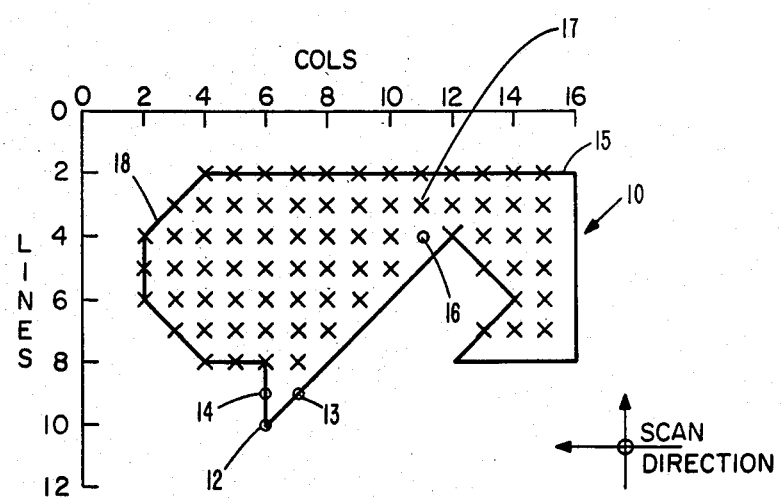
FIG. 2 is a schematic diagram of the graphics line polygon shown in FIG. 1 after a first reverse raster scan pass showing which pixel positions are designated for fill.

Refer now to FIG. 2 showing the closed polygon 10 having a plurality of pixel or dot positions which may be identified by columns extending in the vertical direction and rows or lines extending in the horizontal direction. In the preferred embodiment of the present invention, a raster scan of the pixel positions is started at the lower right-hand corner (row or line 12) and a reverse raster scan sequence order of examination is conducted of each pixel position. When line 12 is reversed scanned, the examination of pixel positions thereon reveals that not a single data word on line 12 describes a pixel position containing a line bit. On the second reverse scan of line 11, starting at the highest order column 16 toward the lowest order column 0, the data describing the pixel positions does not contain any line bit. The third reverse scan starts with row 10 and again no line bits are detected. The scan proceeds until point 12 is scanned at column 6 and row 10. At boundary point 12, the logic circuitry employed to examine the position 12 makes a preliminary determination not to generate a fill bit in the data word and continues to scan columns five to zero. When the reverse raster scan of line 9 occurs, examination of pixel positions reaches column 7 row 9 and column 6 row 9 at points 13 and 14. Again a preliminary determination not to generate a fill bit in the data word is made. A detailed explanation of how this preliminary determination is made will be explained hereinafter. When line 8 is reversed scanned, a preliminary determination is made to insert a fill position at column 7 and sequentially in columns 6, 5 and 4 on the same line 8 but not to insert a fill at column 3 line 8. It is apparent from the examination of where the cross or x marks occur in FIG. 2 that a preliminary determination has been made to insert fill bits in the data word. It is also apparent that preliminary decisions have been made to insert fill bits in the data words which are coincident with and on portions of the lines of polygon 10. For example, the top horizontal line 15 has been preliminarily marked for the insertion of fill bits in the data word. After the completion of all of the first scans in the reverse raster scan sequence order, a second and final scan can be made which will result in a proper fill determination for the polygon 10 as shown in FIG. 3.

Figure 3:
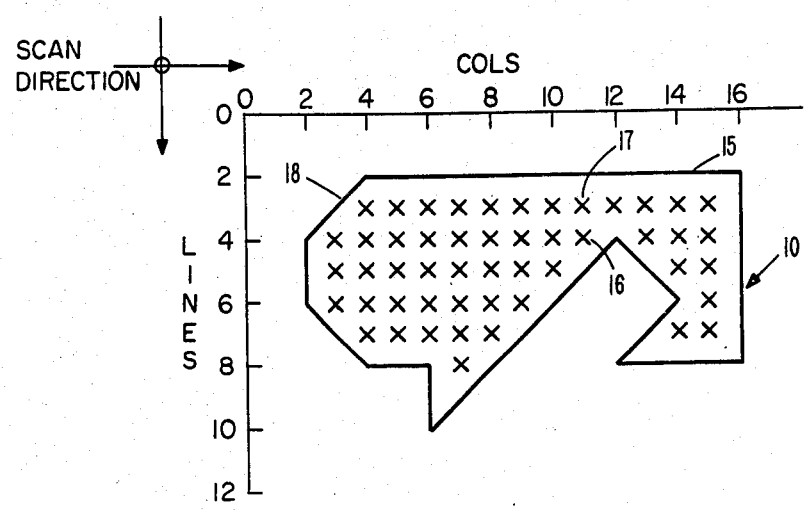
FIG. 3. is a schematic diagram of the graphics line polygon of FIG. 1 after a second forward raster scan pass showing the final determination of fill positions.

In FIG. 3, the forward raster scan is started at the origin or position zero. Lines zero through 12, or the complete number of lines on the screen, are sequentially scanned wherein each individual pixel position is examined for a final determination as to whether a fill data bit shall be inserted in the data word representitive of each pixel location. When the forward raster scan occurs as shown in FIG. 3, a logic determination is made whether a pixel data fill bit has been inserted in the data word which also has a pixel line data bit in the same data word. When this occurs, the pixel fill data bit is eliminated or not written into memory so that fill shading or fill color is not inserted on top of the lines of the polygon. It will be explained in detail hereinafter how line 4 is scanned so that the position 16 is determined to be a pixel location in which a fill bit shall be inserted in the data word. The logic employed for filling position 16 with a fill bit is predicated on the fact that a fill bit has already been inserted at position 17 above.

Having explained briefly where the pixel positions are marked or selected for preliminary fill data bit location, the basic logic may now be explained. When the reverse scan starts as shown in FIG. 2, no fill bit will be marked at the pixel position until such time as it is completely determined that a line has been crossed during the sequence of scanning operations indicative of entering the polygon. After a second line is reached, the logic determination is made that the sequence of scanning is leaving the closed polygon. In similar manner, when a third polygon line is sensed as occurs on line 7 of FIG. 2, the logic determines that a new entry is being made into the closed polygon. After the third line is crossed, the pixel positions are again marked for insertion of fill data bits until the next or fourth line is crossed where a logic determination is made that the sequence of scanning is leaving the closed polygon again. By marking the left side line 18 for preliminary determination of insertion of fill bits the method includes a left side bias. Since the upper horizontal line 15 has been marked for preliminary determination of insertion of fill bits in the pixel locations, there is an upper bias. Thus, the present invention method includes a left-hand and upward bias which is the direction of the reverse raster scan. Any mistakes made in assuming the bias in this direction will all be corrected during the final forward reverse raster scan as shown in FIG. 3.

Figure 4:
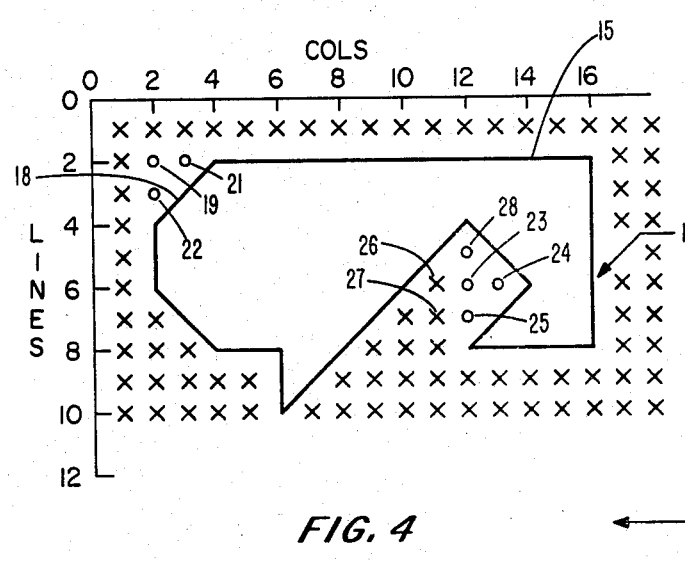
FIG. 4 is a schematic diagram of the graphics line polygon of FIG. 1 after a plurality of preliminary forward and reverse raster scan passes showing the pixel positions which are recorded for protection.

Refer now to FIG. 4 which represents a modified form of the present method. This method does not include a left-hand and upward bias. This method also starts its scan at the lower right-hand corner and continues in the reverse raster scan sequence order of examination of pixel positions. A mark or set bit will be placed in the fill position of the data word at every pixel position which occurs outside of the closed polygon 10. FIG. 4 is adapted to show what occurs after a plurality of reverse raster scans. The first raster scan occurs in the reverse raster scan direction and marks the pixel positions shown by the crosses or x's inserting inhibit bits in the fill bit of the data word. Thus, in FIG. 4 where the crosses occur, those pixel positions are marked for insertion of inhibit bits in their memory locations. It will be noted that no inhibit bits occurred at points 19, 21 and 22 because the reverse raster scan sequence order had ceased marking memory positions when line 18 and the first upper line 15 was detected. However, during the second raster scan in the forward raster scan direction an inhibit bit is marked or inserted at memory location designated by points 19, 21 and 22. Further, during the second and forward raster scan direction, points 23, 24 and 25 which follow pixels 26 and 27, that are marked for fill, will also be marked for fill during the second scan. It is not until the third reverse scan that the pixel position 28 is marked for fill as being above the marked pixel position 23 which was marked for fill on the second raster scan. Thus, in the modified method shown in FIG. 4 during the first reverse raster scan, the bias is to the left and upward whereas during reverse raster scans, the bias is to the right and downward. Thus, any marked pixel position which enters a cavity or recess in a closed polygon will be extended at least one pixel position in the direction in which the cavity is opened during a reverse raster scan and will be extended in the opposite or further direction during a forward raster scan. To implement the modified embodiment shown in FIG. 4, it is assumed that a plurality of preliminary raster scan operations will occur until all of the pixel positions are properly marked for inhibit in the fill bit of the data word. When this occurs, the next following raster scan detects that no change is made in the number of marks or set fill bits or inhibit fill bits, thus, indicating that the preliminary determination is complete. After the preliminary determination is made, another forward or final raster scan is employed to insert color bits in the color bit positions of the data word which are not marked by inhibit fill bits or in which pixel line data bits are already inserted in the data word.

Figure 5:
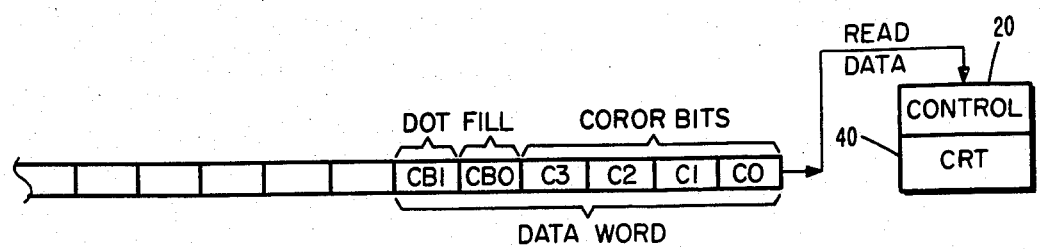
FIG. 5 is a schematic block diagram of the bit positions of a graphic pixel data word.

Refer now to FIG. 5 which shows a schematic block diagram of the data word portion of the memory cells for each pixel position. The cell or bit designated CB1 for control bit is reserved for indicating dot or line information. In the preferred embodiment of the present invention, a set or one bit inserted in the CB1 cell location indicates that there is a line position at that pixel memory location. Similarly, the cell designated CB0 for control bit zero is reserved to indicate that a fill bit has been inserted in memory at the pixel memory location of the data word for a particular pixel or dot position. Since the preferred embodiment of the present invention anticipates the use of as many as sixteen colors, there are shown four color bits designated at C0, C1, C2 and C3. For purposes of explanation of this invention, the data word shall comprise at least the six bits shown as dot fill and color bits. It will be understood that the set or one condition of the data word bits may be read out and stored in a register of controller 20 so that signals indicative of the state of the cells may be applied to logic and control circuits for purposes of controlling a CRT 40 of a visual display terminal screen and/or making logic determinations as to where fill bits and line or dot bits occur or shall not occur.

Figure 6:
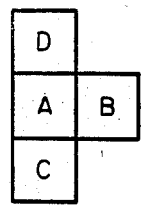
FIG. 6 is a schematic block diagram showing pixel or dot positions at each pixel position during a first reverse raster scan to produce the results shown in FIG. 2.

Refer now to FIG. 6 showing a schematic block diagram of four pixel or dot positions that are examined during the first reverse raster scan operation to produce the results shown in FIG. 2. The present pixel position being examined is designated pixel position A. At pixel position A, there is a data word in memory which will indicate the condition of the control bits CB1 and CB0. Further, to the right shown as pixel position B, there is another data word also having control bits CB1 and CB0 to indicate the state or condition of the data word at the previous pixel position. The B position is designated previous because the direction of scan for reverse raster scan is from B to A. Similarly, the cell or pixel positions D and C are respectively above and below the pixel position being examined and also have data bits in their control bits CB1 and CB0 of their data words.

Figure 7:
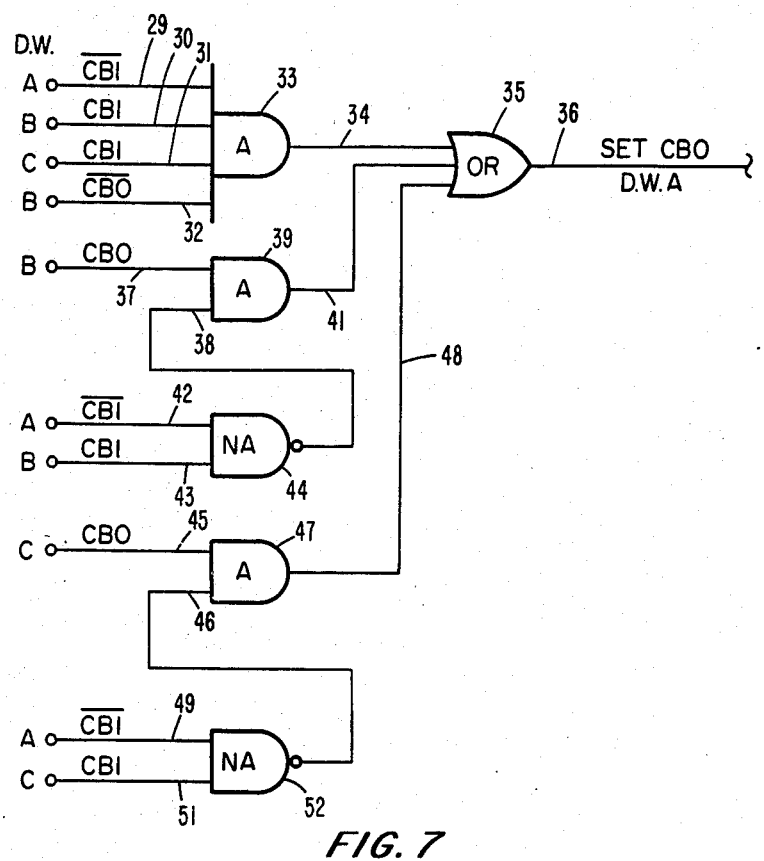
FIG. 7 is a schematic logic circuit diagram showing the gating circuitry employed to achieve the first or preliminary pixel fill selection shown in FIG. 2.

Refer now to FIG. 7 which shows in detail how the data words A, B and C are applied on input lines 29, 30, 31 and 32 to AND gate 33 to produce an output on line 34 which is applied to OR gate 35 to produce a set CB0 signal on line 36. The signal on line 36 is capable of setting the control bit zero of data word A if the conditions at the input of AND gate 33 are all present. Similarly, a second set of conditions are shown on input lines 37 and 38. When these conditions both occur at AND gate 39, an output is produced on line 41 which passes through OR gate 35 and is also capable of setting the control bit zero of data word A. The input line 38 is indicated by the absence of the condition shown on input lines 42 and 43 to NAND gate 44. A third set of conditions which are capable of setting the control bit zero are shown on input lines 45 and 46 to AND gate 47 which produce an output on line 48 when both are present. The condition on input line 46 is generated by the absence of the input conditions shown on input lines 49 and 51 to NAND gate 52.

Figure 8:
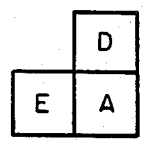
FIG. 8 is a schematic block diagram showing the pixel or dot positions that are examined at each pixel position during a second or forward raster scan to produce the results shown in FIG. 3.

Refer now to FIG. 8 showing a schematic block diagram of the pixel or dot positions that are examined at each pixel position during the second or final forward raster scan operation to produce the results shown in FIG. 3. The cell or pixel position designated A is the pixel position under examination. The cell or pixel position on the line above is designated as position D and the pixel position designated as cell E is the pixel position of the previous or adjacent pixel position which was previously scanned in the forward raster scan operation.

Figure 9:
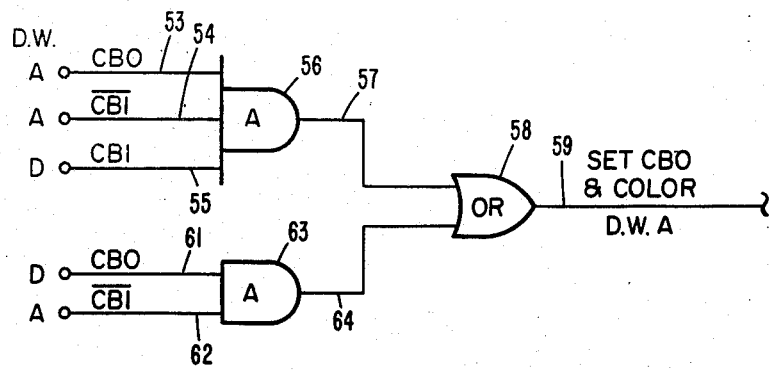
FIG. 9 is a schematic logic circuit diagram showing the gating logic circuitry employed to achieve the results shown in FIG. 3.

Refer now to FIG. 9 showing a schematic logic circuit diagram for producing the results shown in FIG. 3 which results in a complete and proper fill operation during two raster scan times. The input lines 53, 54 and 55 have the conditions indicated thereon from the data words A and D applied to the AND gate 56 to produce an output on line 57 which is applied to OR gate 58 to produce the set control bit zero of data word A condition on output line 59 when all of the designated input conditions are present on the input lines 53 to 55. A second set of conditions for setting control bit zero are shown on input lines 61 and 62 being applied to AND gate 63 to produce an output on line 64 which is applied to OR gate 58 to set the control bit zero of data word A on line 59. When the set signal is generated on output line 59 in the preferred embodiment of the present invention, the color bits C0 to C3 of the data word shown in FIG. 5 are also set. In the preferred embodiment visual display terminal, these color bits are employed to generate the color signals which are displayed on the screen of the visual display terminal.

Figure 10:
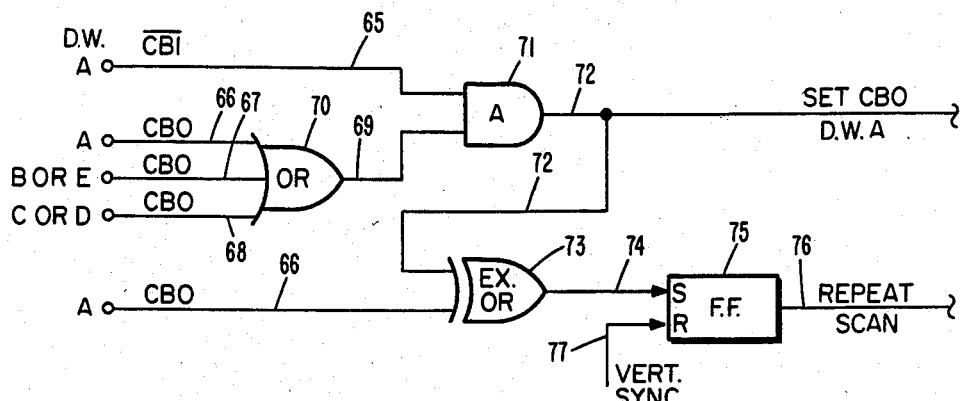
FIG. 10 is a schematic logic circuit diagram showing the logic gating circuitry employed to make a plurality of forward and reverse raster scan passes to achieve the results shown in FIG. 4 when employing the pixel positions shown in FIG. 6.

Refer now to the modified embodiment shown in FIG. 4 and to FIG. 10 showing a schematic logic circuit diagram for producing the selection of pixel positions to be inhibited and not to be filled with color which occur outside of the polygon 10. The logic employed in this modified embodiment is to mark pixel locations which are outside of the polygon 10 of FIG. 4 and to use this information to insert color data into the color bits of the pixel data word to be filled with color inside of the polygon 10. In this modified embodiment, the first preliminary scan is made in the reverse scan direction employing an upward and leftward scanning bias while examining the cells or pixel positions shown as A, B and C in FIG. 6. No pixel positions are marked at a pixel data word which has a line bit in the data word. Thus, CB1 cannot be present if CB0 is to be set on this first and preliminary raster scan. On the second preliminary raster scan which is made in the forward raster scan direction, these cells A, E and D as shown in FIG. 8 are examined.

When the conditions on the input lines 65 and one of the conditions on the input lines 66, 67 or 68 are met, a signal is produced on line 69 and line 65 simultaneously which are applied to AND gate 71 to produce a signal on output line 72 which is employed to set the fill bit of data word A at CB0. Thus, any one of the conditions on input lines 66, 67 or 68 being applied to OR gate 70 are sufficient to produce an output on line 69. In the modified embodiment mode of operation, reverse and forward scan operations are repeated until such time as no change is detected in any of the pixel positions on the screen. This condition is detected by applying the set CB0 position on line 72 and the present CB0 condition of input line 66 to exclusive OR gate 73. When the conditions on lines 66 and 72 are different, there will always be a set signal generated on line 74 which is applied to flip-flop 75 indicating on the output line 76 of flip-flop 75 that another scan operation is necessary. At the end of each reverse or forward scan operation, the vertical sync signal on line 77 is applied to flip-flop 75 to reset the flip-flop 75 for another scan operation. When there is no signal on line 76 at the completion of the scan operation, then the preliminary scan operations are complete and a final scan operation can be made to insert the proper information in the color bit positions in the data word using the information now inserted in the CB0 fill bit positions of the data word.

Figure 11:
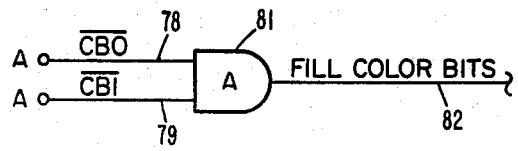
FIG. 11 is a schematic logic circuit diagram showing the logic gating circuitry employed for the final forward raster scan pass utilizing the information developed in FIG. 10 to create the identical results shown in FIG. 3.

Refer now to FIG. 11 showing an AND gate 81 having two inputs designated not CB0 and not CB1 on lines 78 and 79. During the final scan operation if there is no fill bit and no line bit in the data word a plurality of color fill bits are jammed into the bit positions C0 through C3 of the color bit of the data word at the pixel position which is being examined. It will be understood that the output from AND gate 81 on line 82 is employed to enable the insertion of the color bit data into the data word which will be employed as fill color data at the pixel position in which the color bits are located.

Having explained a preferred embodiment and a modified embodiment of the present method of detecting when a raster scan passes through a line which is indicative of entering a polygon, it will be understood that fill bits are inserted until the second or subsequent line is reached indicative of a line which indicates that the scan is leaving the polygon. If this information alone is used, it could be employed to fill a rectangle but would not be capable of filling other irregular shaped polygons. Thus, the present method has started with the concept that the polygon is not rectangular and that fill positions will be designated during the preliminary scan which are, in fact, errors. The method presently employed will always require a second forward raster scan operation to erase the errors purposely introduced and to complete the proper fill designation for the pixel positions which will require fill data.

An important feature of this invention is that it can be completed in the time required for two complete raster scan operations. A standard American TV set which operates a forward raster scan in 1/60th of a second and a second interleaving scan during another 1/60th of a second will complete two raster scans in 1/30th of a second or 33⅓ milliseconds. If the visual display terminal employs a high resolution fast operating raster scan then the completion of the fill operation can be completed in less than 33 milliseconds or whatever the time for two raster scan operations require. In the present state of the art, employing software and designating positions within the polygon to be filled outward from the position consume an excessive amount of time. When the polygons are complex, the fill operation require seconds. Not only is excessive time required to determine the fill operation but when software is used, the processor in the individual display terminal is tied up on-line completing the logical determinations for the fill operation. It will be appreciated that using the present simplified hardware and method only two raster scan operations are required and that the hardware which performs the logical determination is not being controlled by software, thus, the computer is free to perform other operations.

In order to complete the fill operation within two raster scan operations, it is preferred that more than one pixel position is read out and examined simultaneously. The present circuits are designed to read out of memory as many pixel positions as is necessary to make the logical determinations indicated in the aforementioned specification before the electron beam of the cathode ray tube requires the information. The data is written into the data word before being required for operation of the monitor or being read to the control circuits to perform the fill operation.

It will be understood that the information being written into the data words to perform the graphics line fill operations is constantly being refreshed in raster scan sequence time. This information will also require that it be read in advance a number of bit times from the data word when the fill operation is being performed in raster scan time.

We claim:

1. A high speed graphics fill raster scan method of generating fill data bits for positions within a gaphics polgon on a graphics display of the type having a pixel graphics memeory having addresses that define each pixel position and provide a pixel data word in said graphics memory comprising a pixel line data bit and a pixel fill data bit for each pixel position, comprising the steps of:

erasing said pixel line and fill data bits in said pixel data word, writing into said said pixel graphics memory pixel line data bits to define said graphics polygon, reading in reverse raster scan sequence order each pixel data word, making a preliminary determination based on the presence of a pixel line data bit at each pixel position whether a boundary of said graphics polygon has been crossed and whether said pixel position exist inside of said graphics polygon and would require a pixel fill data bit, writing a preliminary pixel fill data bit in said pixel data word in accordance with said preliminary determination, reading in forward raster scan sequence order each pixel data word, making a final determination at each pixel position whether a boundary of said graphics polygon has been crossed based on the presence of a combination of pixel line data bits and whether said pixel position would require a pixel fill data bit as being inside said graphics polygon, and writing a final pixel fill data bit in said pixel data word based on the presence of a pixel fill data bit already existing in said pixel data word and the absence of a pixel line data bit existing in said pixel data word.

2. A high speed graphics fill method as set forth in claim 1 which further includes the steps of:

providing color data bits in said pixel data word, and writing color data bits in said data word where final pixel fill data bits have been written in said data word.

3. A high speed graphics fill method as set forth in claim 2 which further includes the step of:

reading said color data bits in said data words, and generating color control signals for controlling the electron beams of a color CRT in accrdance with said color data bits.

4. A high speed graphics fill method as set forth in claim 1 which further includes the steps of:

reading said final pixel fill data bit in said pixel data word, and using said fill data bit to generate a write signal for controlling the electron beam of a color CRT.

5. A high speed graphics fill method as set forth in claim 3 which further includes the steps of:

reading said final pixel fill data bit, and simultaneously generating said color control signals for controlling said election beam of said CRT.

6. A high speed graphics fill method as set forth in claim 1 which further includes the step of reading some of said final pixel fill data bits in said pixel data words for current use concurrently while making a final determination to write a final pixel fill data bit in other pixel data words for subsequent use.

7. A high speed graphics fill method as set forth in claim 1 wherein said step of making a preliminary determination at each pixel position comprises the step of:

determining that a pixel line data bits exists in the previous pixel position and that a pixel line data bit exists in the pixel position in the line below as a condition for writing a preliminary pixel fill data bit in the present pixel data word.

8. A high speed graphics fill method as set forth in claim 1 wherein said step of making a preliminary determination at each pixel position comprises the step of:

determining that a pixel fill data bit exists in the previous pixel position as a condition for writing a preliminary pixel fill data bit in the present data word.

9. A high speed graphics fill method as set forth in claim 1 wherein said step of making a preliminary determination at each pixel position comprises the step of:

determining that a pixel line data bit exists in the previous pixel position and that a pixel data bit exists in the pixel position in the line below as a condition for writing a preliminary pixel fill data bit in the present data word.

10. A high speed graphics fill method as set forth in claim 1 wherein said step of making a preliminary determination at each pixel position comprises the step of:

determining that a pixel fill data bit and a pixel line data bit exists in the previous pixel position AND that the present pixel position exists as a condition for writing a preliminary pixel fill data bit in the present data word.

11. A high speed graphics fill method as set forth in claim 1 wherein the step of making a preliminary determination at each pixel position comprises the step of:

determining that a pixel line data bit exists in the previous pixel position AND that a pixel fill data bit exists in the previous pixel position as a condition for NOT writing a preliminary pixel fill data bit in the present data word.

12. A high speed graphics fill method as set forth in claim 1 wherein the step of making a preliminary determination at each pixel comprises the step of:

determining that a pixel line data bit exists in the present pixel position AND that a pixel fill data bit exists in the pixel position in the line below as a condition for writing a preliminary pixel fill data bit in the present data word.

13. A high speed graphics fill raster scan method of generating fill data bits for positions within a graphics polygon on a graphics display of the type havng a pixel graphics memory having addresses that define each pixel position and provide a pixel data word in said graphics memory comprising a pixel line data bit, a pixel fill data bit and color data bit for each pixel position, comprising the steps of:

erasing said pixel line and fill data bits of said data word, writing into said pixel graphics memory pixel line data bits to define said graphics polygon, reading in reverse TV type raster scan sequence order each pixel data word, reading in forward TV type raster scan sequence order each pixel data word, making a preliminary determination at each pixel position whether a boundary of said graphics polygon has been crossed and whether said pixel position exist inside said graphics polygon and would not require a pixel fill data bit, writing a preliminary inhibit pixel fill data bit in said word in accordance with said preliminary determination, reading each pixel data word in raster scan sequence, determining that no inhibit pixel fill data bits have been written during the last raster scan sequence, and, writing final color bits in said pixel data words in all pixel positions not inhibited by a pixel line data bit or an inhibit pixel fill data bit.

* * * * *